5/13/86 XR 4,588,923

United States Patent [19]

Hoegler et al.

[11] Patent Number: 4,588,923

[45] Date of Patent: May 13, 1986

[54] HIGH EFFICIENCY TUBULAR HEAT LAMPS

[75] Inventors: Leonard E. Hoegler, Solon; Lee W. Otto, Pepper Pike, both of Ohio

[73] Assignee: General Electric Company, Schenectady, N.Y.

[21] Appl. No.: 489,983

[22] Filed: Apr. 29, 1983

[51] Int. Cl.[4] .......................... H01K 1/26; H01K 1/32; G02B 5/22; G02B 5/28

[52] U.S. Cl. .......................... 313/579; 313/112; 313/580; 350/1.6; 350/166

[58] Field of Search .......................... 313/579-580, 313/112, 635; 350/1.6, 164, 166; 362/293

[56] References Cited

U.S. PATENT DOCUMENTS 2,424,454 7/1947 Gordon .......................... 313/112 X
4,179,636 12/1979 Janssen .......................... 313/274
4,229,066 10/1980 Rancourt et al. .......................... 350/1.6
4,346,324 8/1982 Yoldas .......................... 313/112

FOREIGN PATENT DOCUMENTS 2103830 3/1983 United Kingdom .

*Primary Examiner*—Palmer C. DeMeo
*Assistant Examiner*—Sandra L. O'Shea
*Attorney, Agent, or Firm*—John P. McMahon; Philip L. Schlamp; Fred Jacob

[57] ABSTRACT

A lamp adapted to various residential, commercial and industrial needs by a reflective film is disclosed. The disclosed lamp having the reflective film transmits desired portions of the radiation spectrum selected for impinging onto various mediums. Also disclosed are various arrangements of the reflective film along with various desired film characteristics selected for various mediums to be impinged.

7 Claims, 4 Drawing Figures

HIGH EFFICIENCY TUBULAR HEAT LAMPS

The invention relates to highly efficient tubular tungsten filament lamps particularly useful for heat lamps intended for radiant people heaters, heat lamps for industrial purposes, lamps that emit selected portions of the infrared and visible light spectrum so as to provide lamps for the studio industry having a daylight color, and lamps that for various applications emit substantially only infrared radiation.

BACKGROUND OF THE INVENTION

The trend toward lower temperatures in home and offices during cool weather, which has been brought on by the high cost of fuels and heating, has caused a resurgence in popularity of radiant electric heaters. In radiant heating, the heat in the form of infrared radiation travels directly from the source to the object, such as a person, being heated without encountering a substantial loss to the intervening air. When heat radiation emitted from the radiant heater impinges onto the skin of a person, a portion of impinging heat radiation is transmitted through the skin and interacts directly with the nerve ends and the small blood vessels of the body so as to create the sensation of warmth for the person. The heating efficacy of a heat source such as a radiant or heat lamp may be determined by ratio of the amount of radiation penetrating the skin divided by the total radiation emitted from the heat source or lamp.

It is desired that the radiation emitted by the radiant heater be preferentially selected to a desired portion of the radiation spectrum so that upon impingement of the human body its effect is substantially utilized. Such a desired portion of the radiation spectrum are wavelengths of about 1.2 to 1.7 microns.

Further, a radiant heater for residential use may typically be located within a room, such as a family room having a television, wherein the visible portion of the radiation spectrum emitted by the radiant heater may distract from the desired television viewing. Further still, the visible radiation emitted by the radiant heater serves no practical useful purpose for warming people. It is considered desirable that the visible portion of the radiation spectrum typically emitted by the radiant heater be substantially reduced.

In addition to providing radiant heat for people heating, heat lamps provide various curing functions for various industrial purposes. For example, heat lamps for curing or drying clear plastics so as to harden the clear plastics in a relatively short time are of primary importance to the packaging industry.

The curing function desired to be performed for the industrial usage is dependent, in part, on the characteristic of the medium, such as the plastic, to be cured. For example, one type of medium may be more rapidly cured when subjected to specific portions of the radiation spectrum, whereas, another type of medium may be more rapidly cured when subjected to other portions of the radiation spectrum. It is desired that the industrial art be provided with a heat lamp having means to preferentially adapt the radiation of a heat lamp to a wide variety of industrial processes while performing each of the industrial processes in a highly efficient manner.

In addition to the needs of the various industrial processes and radiant heaters, it is desired that a lamp having a radiant source be preferentially adapted to other various arts not desiring efficient heating or curing. For example, it is of particular importance to the stage and studio lighting arts that a lamp be provided that simulates a daylight color in the range of Correlated Color Temperature of 5500 degrees Kelvin. Still further, due to the increasing cost of energy it is important that the simulated daylight color be provided in an efficient manner. It is considered desirable that a lamp be provided having means so as to be adapted to the needs of the stage and studio arts.

Furthermore, in addition to the above multiple needs for people heating, industrial processing, and the stage and studio arts, various other considerations for providing various types of radiant heat and selected portions of the light spectrum may be envisioned. For example, it may be desired to provide a radiant source for infrared photography which emits substantially all of the infrared radiation while substantially reducing the visible radiation emitted by the light source.

Accordingly, objects of the present invention are, (1) to provide new and improved electric radiant heat sources or lamps which have higher efficacy in selected portions of the spectrum than what has heretofore been available, and more particularly, a lamp more effective as a radiant people heater, (2) provide a radiant heat source having means so as to be adaptive to various curing functions desired for various industrial processes, and (3) provide a lamp source having means so as to select portions of infrared and visible radiation spectrum desired to be emitted by the lamp source for various studio, stage, and other types of applications.

These and other objects of the present invention will become more apparent upon consideration of the following description of the present invention.

SUMMARY OF THE INVENTION

This invention is directed to a highly efficient radiant source having means for selecting the desired portion of the radiation spectrum emitted by the radiant source so as to preferentially adapt the radiant source to various modes of heating persons, industrial processing, curing and other various commercial needs.

In one embodiment of the present invention a lamp for transmitting a desired portion of the radiation inhibiting transmission of an unwanted portion of the radiation spectrum is disclosed. The lamp comprises a radiation transmissive envelope and a radiant source comprising a tungsten filament for emitting radiation having wavelengths in both the visible and infrared portions of the radiation spectrum. The radiant source is housed within the radiation transmissive envelope. The lamp further comprising a reflective film on the outer surface of the radiation transmissive envelope. The film being capable of operating at a temperature in the range of up to and including 950° C. The film filters the radiation to be transmitted by the lamp. The film is formed of a plurality of layers of high and low indices of refractory material and effective to establish a pass-band characteristic and a stop-band characteristic both for the portion of radiation to be transmitted by the lamp. The pass-band and stop-band characteristics are selected for the medium desired to be impinged by the radiation to be transmitted by the lamp.

DETAILED DESCRIPTION

Figure 1:
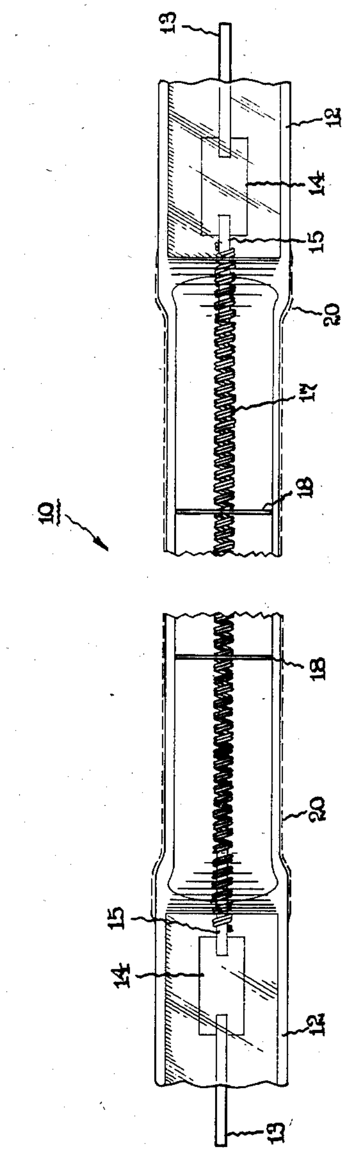
FIG. 1 is a side view of an elongated heat lamp of one embodiment of the present invention.

FIG. 1, illustrates one embodiment of the present invention of a heat lamp having preferential emission of the infrared portion of the radiation spectrum. The heat lamp comprises a radiation transmissive envelope 10. The envelope 10 may be of an elongated tubular shape and comprised of a clear fused quartz, or translucent fused quartz, or a quartz-like glass such as that known commercially as Vycor available from Corning Glass Works of Corning, N.Y. and which contains approximately 96% quartz. Although quartz material is given for the tubular envelope 10, the practice of this invention is equally applicable to glass-type tubular envelope. Further, although FIG. 1 shows the tubular envelope 10 as of a double-ended type, the practice of this invention also contemplates a single-ended type tubular envelope.

The double-ended envelope 10 shown in FIG. 1 may have a typical outside diameter in the range of about 7.9 mm (0.3125 inches) to 9.5 mm (0.375 inches) and a typical wall thickness of about 1.0 mm (0.04 inches). Each end of the envelope 10 has a pinched portion 12 through which is sealed a lead-in conductor 13 connected to another lead-in conductor 15 by a thin intermediate foil portion 14 which is hermetically sealed and embedded in the pinch portion 12. The foil portion 14 may be a separate piece of molybdenum welded to one end of each of the lead-in conductors 13 and 15. Alternatively, the foil portion 14 is an integral portion of a single length of molybdenum wire which also includes lead-in conductors 13 and 15. The integral foil portion 14 may be formed by longitudinally rolling and compressing the intermediate portion of the single length of molybdenum wire. Further, for a glass type tubular envelope 10 the lead-in conductors 13 and 15 may be a single rod-type member, not having foil portions 14, for a straight through entrance into tubular envelope 10.

Figure 2:
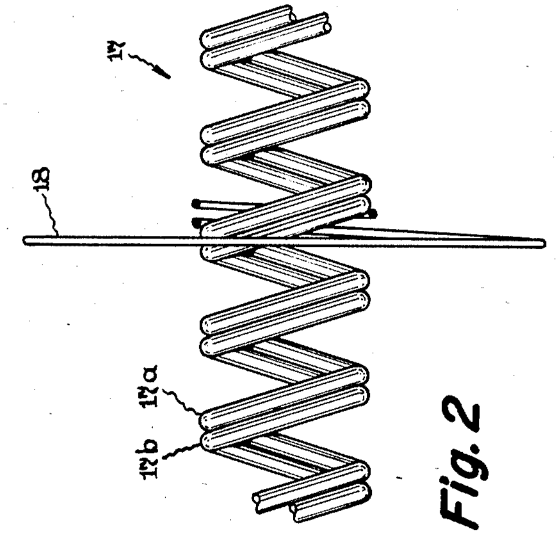
FIG. 2 shows a double coil of the multiple coil concept comprising the filament shown in FIG. 1.

The envelope 10 has a multiple helically coiled filament 17 of tungsten wire extending through it in an axial manner. The filament 17 is shown more clearly in FIG. 2 as a multiple coil 17 consisting of more than one wire coils 17*a*, 17*b*, which are wound in parallel manner to each other. Each of the coils 17*a* and 17*b* are formed of tungsten and are the same wire diameter and coil size. The coils 17*a* and 17*b* are electrically and mechanically connected at their ends to each of the lead-in conductors 15 in any suitable manner, for example by spudding techniques well-known in the art. The filament 17 is supported on its axis within the envelope by a plurality of suitable supporting members 18 which are preferably tungsten spiral wire supports as disclosed in U.S. Pat. No. 3,168,670—Levand.

The filament 17 is under sufficient physical tension between the lead-in conductor 13, located at each end of the envelope 10, to prevent the filament 17 from sagging when it undergoes thermal expansion such as that which occurs when the filament 17 is heated to its operating temperature by application of current.

In general, the filament 17 has various parameters such as (1) a wire diameter D in mils, (2) an active lighted wire length L in m.m., (3) a % pitch, and (4) a % mandrel. The % pitch is given as:

$$\% \text{ Pitch} = Z/D: 100 \quad (1)$$

where Z is the distance of spacing between adjacent turns of the filament 17 and D is the diameter of the wire of filament 17.

The % mandrel is given as:

$$\% \text{ Mandrel} = M/D: 100 \quad (2)$$

where M is the diameter of the coiling mandrel for filament 17 and D is the diameter of the wire of filament 17.

The diameter D of filament 17 may have a range of approximately 1.5 to 15 mils. The active length L of filament 17 may have a range of approximately 1000 to 5000 m.m. The % Pitch of filament 17 may have a range of approximately 120 to 250%. The % mandrel may have a range of approximately 250 to 650%.

The filament 17 also has related parameters of $J_{tc}$ and $\rho_c$, where $J_{tc}$ is the total input power per unit wire surface area of the filament 17 and $\rho_c$ is the resistivity of the tungsten coil of filament 17 at a given radiant efficacy and is given in ohms-cm.

The $J_{tc}$ may be expressed as:

$$J_{tc} = \frac{W}{\pi DL} \quad (3)$$

where (1) W is total input power in watts applied to filament 17, and (2) D and L are as previously given.

The relationship of expression (3) may be expressed as:

$$J_{tc} = \frac{Prc + Plc}{\pi DL} \quad (4)$$

where Prc is the total power radiated by filament 17 and Plc is the total filament power losses.

The resistivity $_c$ may be expressed as:

$$\rho_c = \frac{(V/I)\,\pi D^2}{4L} \quad (5)$$

where (1) V is applied voltage and (2) I is the applied current.

The quantities $J_{tc}$ an $\rho_c$ have been determined experimentally over a wide range of filament operating temperatures for various embodiments of the present invention. The parameter $J_{tc}$ and $\rho_c$ are chosen for a specified film 20 design and desired efficacy for a given application so as to particularize and define the filament design. The quantities $J_{tc}$ and $\rho_c$ are therefore functions of, (1) film 20 design, (2) filament geometry, (3) fill-gas type, (4) fill-gas pressure and (5) lamp system power losses.

The filament 17 is housed in the envelope 10 of FIG. 1 which contains a filling of a suitable inert gas such as argon, typically at a pressure in the range of about 10 to about 3000 Torr measured at room temperature. The lamp also contains a small quantity of a halide substance such as bromine whose function is to set up a regenerative cycle which removes any darkening deposit of tungsten on the envelope wall and redeposits it on the filament. Preferably the fill gas is argon with a bromide additive of the halide substance family such as the composition $CH_3Br$ and in a range of 0.01 to 0.5%.

FIG. 1 shows the envelope 10 of the present invention as having a coating 20, shown as a dashed line at the outer edges of lamp 10. The coating 20 is of substantial importance to the present invention and covers the outer surface of envelope 10. As discussed in the "Background'" it is desired that a lamp, such as the heat lamp 10, have means so as to adapt the lamp to various needs of various arts, such as, (1) radiant heaters for residential purposes such as for people heating, (2) heat lamps for industrial processing such as curing and (3) lamps which transmit desired portions of the radiation spectrum and if desired reduce selected portions of the radiation spectrum for transmittance. The means of adapting the lamps, of the present invention is provided, in part, by the film 20 which is comprised of various compositions so as to be adaptive to various applications. Selection of the parameters of the film 20 along with the operating temperature of the filament 17 provide a lamp 10 selectively adapted for fulfilling the needs of a plurality of arts which utilize heat lamps.

In general, the film 20 acts as a filter to the radiation emitted by the lamp 10 so that the radiation transmitted by the lamp 10 is adapted to the various needs of various arts. Still further, the film 20 acts as a means for reducing the wattage utilized by the lamp 10. The reduction in wattage utilization is achieved by reflecting portion of the radiation spectrum unwanted for outward transmission of the lamp back toward the filament 17 so as to advantageously increase the operating temperature of the filament 17, which, in turn, decreases the amount of applied power necessary to obtain the desired filament temperature.

The film 20 is comprised of high and low indices of refractory layers arranged so as to adjust the pass-band and the "stop-band" characteristics of the emitted radiation of the lamp as is to be described. The film 20 having various compositions for various applications may, if desired, perform both functions of reflecting selected portions of the the radiation spectrum emitted by the tungsten filament back toward the filament as well as enhancing selective portions of the visible spectrum transmitted by the lamp.

The film 20 has a high operating temperature in the range of up to and including about 950° C. The film 20 may be of a reflective type such as disclosed in U.S. Pat. No. 4,229,066 of J. D. Rancourt et al., issued Oct. 21, 1980 describing its tantalum pentoxide $Ta_2O_5$ and fused silica $SiO_2$ reflective film.

The film 20 may be comprised of stack arrangements of alternate layers of the tantalum pentoxide $Ta_2O_5$ and the silicon dioxide $SiO_2$ materials. As described in U.S. Pat. No. 4,229,066 the tantalum pentoxide $Ta_2O_5$ is of a high index material having an index of refraction in the order of 2.0, whereas, the silicon dioxide $SiO_2$ is of a low index material having an index of refraction in the order of 1.45. In general, a high index of refraction material is meant to represent those materials having indices of refraction greater than about 1.7, whereas, a low index of refraction material is meant to represent those materials having indices of refraction less than about 1 7.

The film 20 may be of a first, a second, and a third stack arrangement, with each stack formed of various thicknesses of layers of the high and low indices of refraction materials. The stack arrangement of film 20 may comprise the first, the second and then the third stack which sequence of stacking is repeated nine (9) times so as to form a total of twenty-seven (27) layers. The sequential stacking arrangement of film 20 is selected in accordance with various embodiments of the present invention.

In one embodiment of the present invention related to radiant heaters, such as people heaters, the film 20 is comprised of materials such as tantalum pentoxide $Ta_2O_5$ and silicon dioxide $SiO_2$ arranged into a multilayer film. In this embodiment the film 20 reflects a majority of the visible radiation of the radiation spectrum emitted by the tungsten filament 17 of FIG. 2. while transmitting a majority of the infrared radiation. The embodiment of the present invention related to radiant heaters may be more fully appreciated by first referring to a radiant heater having the characteristics of FIG. 3 not having the advantages of the present invention and then comparing such a radiant heater against a radiant heater in accordance with the practice of the present invention having the characteristics of FIG. 4.

Figure 3:
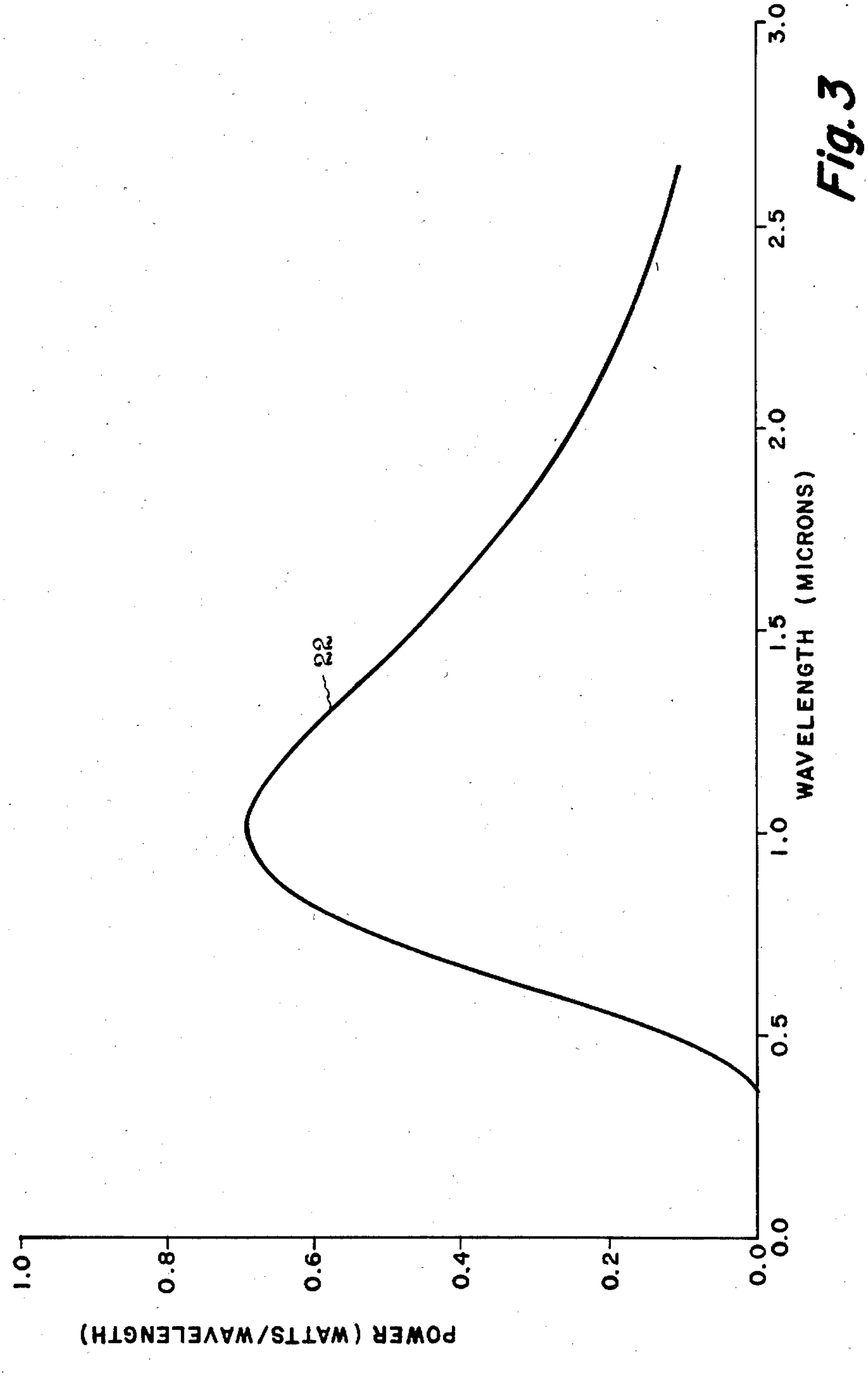
FIG. 3 shows a Spectral Power Distribution Curve of a radiant heater not having a film of the present invention on its outer surface.

FIG. 3 shows a curve 22 of the Spectral Power Distribution of a radiant heater, not having the film of the present invention, with regard to particular wavelengths of the radiation spectrum. The y axis of FIG. 3 shows the Spectral Power Distribution in watts per wavelength, whereas, the X axis of FIG. 3 shows the wavelength of the radiation spectrum given in microns. The curve 22 of FIG. 3 shows the transmitted power distribution as measured outside the lamp. The radiant heater of FIG. 3 has a tungsten filament temperature of approximately 2700° K.

From FIG. 3 it should be noted that the curve 22 is of a relatively smooth type having (1) a smoothly and slowing rising initial portion, (2) a peak portion corresponding to a wavelength of about 1.0 micron, and (3) a smoothly and slowing decaying terminal portion. The advantages of the present invention may now be more fully appreciated with reference to FIG. 4.

Figure 4:
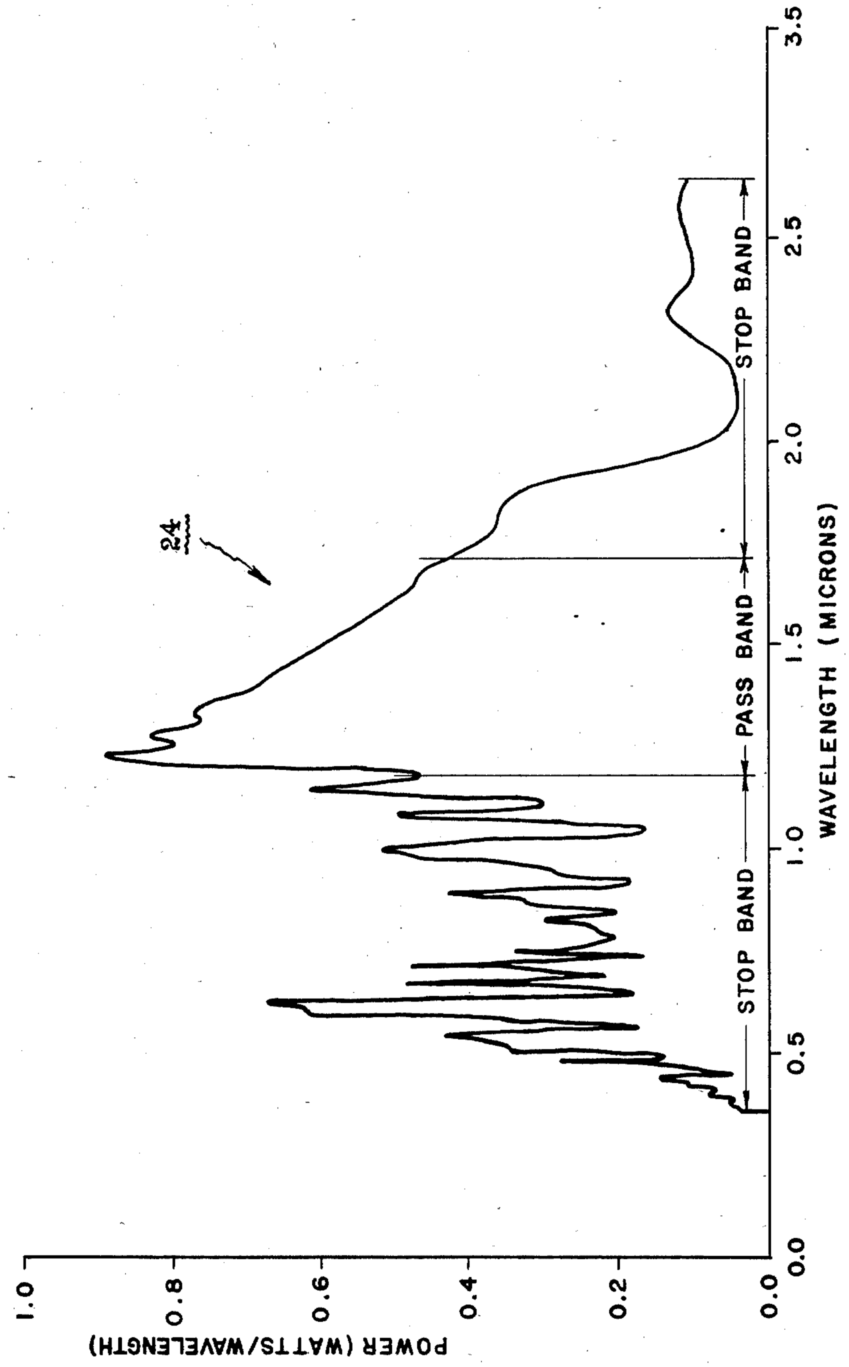
FIG. 4 shows a Spectral Power Distribution Curve of a radiant heater in accordance with a lamp of the present invention having a film on its outer surface.

FIG. 4 is similar to FIG. 3 with regard to its X and Y axes. However, FIG. 4 shows curve 24 quite different from the curve 22 of FIG. 3. FIG. 4 shows the Spectral Power Distribution curve 24 of a radiant heater with a filament operating temperature of 3000° K. having (1) a choppy spike-like initial portion, (2) a peak portion corresponding to a wavelength of about 1.2 microns and (3) a sharply falling terminal portion. The curve 24 of FIG. 4 shows that a radiant heater of the present invention has (1) a stop-band of in the ranges shown in FIG. 4 of about (a) about 0.35 to about 1.2 microns and (b) about 1.7 to about 2.6 microns, a pass-band in the range shown in FIG. 4 of about 1.2 to about 1.7 microns. The curve 24 of FIG. 4 is representative that the present invention reflects back toward the filament a majority of the visible radiation having wavelengths in the stop-band of 0.35 to 1.2 microns, while transmitting the majority of the infrared radiation in the pass-band having wavelengths in the range of about 1.2 to 1.7 microns. The stop-band is a highly reflective region of the characteristic of the film 20. The portion of visible radiation not reflected by film 20 is either transmitted through the film 20 or absorbed by the film 20.

A radiant heater having the characteristics of FIG. 4 and a radiant heater having the characteristics of FIG. 3 was simulated by computer modeling techniques. The computer model for the radiant heater of FIG. 4 specified the previously discussed sequentially triple stacked film 20 wherein (1) the first stack had a tantalum pentoxide ($Ta_2O_5$) layer having a thickness of 83 nanometers and a silicon dioxide ($SiO_2$) layer having a thickness of 155 nanometers, (2) the second stack had a tantalum pentoxide ($Ta_2O_5$) layer having a thickness of 372 nanometers and a silicon dioxide ($SiO_2$) layer having a thickness of 142 nanometers, and (3) the third stack had a tantalum pentoxide ($Ta_2O_5$) layer having a thickness of 366 nanometers and a silicon dioxide ($SiO_2$) layer having a thickness of 245 nanometers. The advantages of the practice of the present invention for a radiant heater having a film 20 relative to radiant heaters not having film 20 are given in Table 1.

TABLE 1

| | Filament Operating Temp. | Lamp Losses | Total Power | % of radiation in Desired Spectrum of 1.2-1.7 Microns | Useful Power |
|---|---|---|---|---|---|
| Radiant Heater Without Film 20 | 2700° K. | 133.9W | 1071.7W | 23.08 | 247.3W |
| Radiant Heater With Film 20 | 3000° K. | 140.5W | 1071.9W | 30.02 | 321.8W |

From Table 1 it should be noted that the practice of this invention increases the operating temperature of the filament from 2700° K., radiant heater not having film 20, to 3000° K. for a radiant heater having a film 20. The filament temperature of 2700° K. is the optimum operating temperature for a tungsten filament without the coating to produce the maximum amount of radiation in the desired wavelength band which is 1.2 to 1.7 microns, whereas, with the coating 20 the tungsten filament temperature of 3000° K. is the optimum operating temperature to produce the maximum amount of radiation in the desired wavelength band of 1.2 to 1.7 microns. Further, from Table 1 it should be noted that each of the radiant heaters have substantially the same total power characteristic. The present invention contemplates that by increasing the operating temperature of the filament while maintaining its total power characteristic the life of the radiant heater of the present invention is somewhat reduced. It is well-known that the life and filament temperature of lamps are interrelated in that an increase in filament temperature causes a reduction in the life of the lamp and a decrease in filament temperature prolongs the life of the lamp. If desired, the operating temperature of the filament and therefore the resulting lamp life can be maintained as a constant. If this is done, the efficacy gains of the improved device will be somewhat less than the efficiency gain that is realized when the optimum filament temperature is selected.

The parameter of the Table 1 of the % radiation in the desired spectrum of 1.2 to 1.7 microns, related to the radiation spectrum of FIG. 3 and 4, is of substantial importance to the present invention and is shown as 23.08% quantity for the radiant heater without a film 20 corresponding to 247.3W of useful power for heating people, whereas, the radiant heater having a film 20 has a quantity of 30.02% corresponding to 321.8W of useful power for people.

The quantity of 30.02% of the radiant heater having film 20 represents an approximate gain of 30% relative to the radiant heater not having a film 20. The gain of 30% in the portion of wavelengths of 1.2 to 1.7 micron of the radiation spectrum is of substantial importance to radiant heaters desiring this selected portion for enhanced heating of people. Furthermore, this enhanced heating is accomplished by reflecting back toward the filament the visible radiation not needed nor desired for people heating. The reflected radiation increases the operating temperature of the filament and improves the efficacy of the lamp.

Another embodiment of the present invention is specially adapted to the industrial needs of drying paper. The drying of paper desires radiation in the range of wavelengths of 1.86 to 2.0 microns for heating or drying purposes.

In a manner similar to that used for the radiant heater of the present invention, computer model techniques were performed so as to compare a heat lamp, not having a film 20, utilized for drying paper against a heat lamp having a film 20. In a manner similar to that described for the computer model techniques of the radiant heater having a film, the computer model for paper dryer specified tantalum pentoxide $Ta_2O_5$ layers having thicknesses of 107 nanometers, 265 nanometers, and 207 nanometers for the first, second and third stacks respectively. Similarly, silicon dioxide ($SiO_2$) layers having thicknesses of 188 nanometers, 170 nanometers and 155 nanometers were specified for the first, second and third stacks respectively. The film 20 for paper drying were specified to have a stop-band in the range of wavelengths of about to about 0.4 to about 1.8 microns, whereas, a pass-band in the range of wavelengths of about 1.86 to about 2.0 microns was specified.

The advantages of the practice of the present invention for a paper dryer having a film 20 relative to a paper dryer not have a film 20 is shown in Table 2.

TABLE 2

| | Operating Temp. | Lamp Losses | Total Power | % of Radiation in Desired Spectrum of 1.86 to 2.0 Microns | Useful Power |
|---|---|---|---|---|---|
| Paper Dryer Without Film 20 | 2200° K. | 110.0 W | 513.5 W | 3.91 | 20.1 W |
| Paper Dryer With Film 20 | 2500° K. | 110.1 W | 513.5 W | 5.15 | 26.4 W |

In a manner as described for Table 1, the paper dryer of Table 2 having the film 20 has a 31.7% gain in the desired wavelengths of 1.86 to 2.0 microns desired for drying paper relative to the paper dryer of Table 2 not having the film 20.

A still further embodiment of the present invention is specially adapted to the industrial needs of infrared photography and drying or sealing cellulose acetate (clear plastic). The needs of the infrared photography and the clear plastics desire that wavelengths of radiation being emitted by a lamp source be in the radiation spectrum of 2.2 to 3.0 microns.

In a manner similar to that described for the radiant heater and paper dryer, computer modeling techniques were performed so as to compare a heat lamp, not having a film 20, against a heat lamp having a film 20 both utilized for infrared photography and clear plastics. For the infrared photography and clear plastics the computer model specified tantalum pentoxide $Ta_2O_5$ layers having thicknesses of 137 nanometers, 299 nanometers, and 242 nanometers for the first, second and third stacks respectively. Similarly, silicon dioxide ($SiO_2$) layers having thicknesses of 207 nanometers, 219 nanometers and 190 nanometers were specified for the first, second and third stacks respectively. The film 20 for infrared photography and clear plastics were specified to have a stop-band in the wavelengths of about 0.4 to 2.15 microns, whereas, a pass-band in the wavelengths of about 2.2 to 3.0 microns was specified. The advantages of the practice of the present invention for a lamp infrared (IR) photography and clear plastics having a film 20 relative to such a lamp without a film 20 are given in Table 3.

TABLE 3

| | Filament Operating Temp. | Lamp Losses | Total Power | % of Radiation in the Desired Spectrum of 2.2 to 3.0 Microns | Useful Power |
|---|---|---|---|---|---|
| Lamp for IR Photograph and Clear Plastics not having a Film 20 | 1930° K. | 87.9 W | 269.9 W | 13.07 | 38.8 W |
| Lamp for IR Photograph and Clear Plastics Having a Film 20 | 2150° K. | 90.9 W | 297.5 W | 16.2 | 48.3 W |

In a manner as described for Tables 1 and 2, the lamp for IR photography and clear plastics of Table 3 having the film 20 has a 24.1% gain in the desired wavelengths of 2.2 to 3.0 microns desired for IR photography and clear relative to the lamp for IR photography and clear plastics of Table 3 not having the film 20.

Still further, in another embodiment of the present invention, the film 20 adapts the lamp 10 to the needs of the stage and studio arts. The film 20 is selected so as to allow lamp 10 to transmit an approximate daylight color in the range of 5500° Kelvin. The film 20 is selected to perform as an infrared reflecting filter so as to establish a "stop-band" in a portion of the visible specturm so that the resulting lamp output light has an apparent color temperature of approximately 5500° Kelvin. In such an application the film 20 may be selected to be comprised of the materials tantalum pentoxide $Ta_2O_5$ and silicon dioxide $SiO_2$ in a manner similar to that previously described for our radiant heater, infrared photography and paper dryer.

It should now be appreciated that the practice of the present invention provide, among other things, (1) an improved radiant heater for people heating, (2) an improved lamp for industrial purposes such as drying paper, (3) an improved lamp for infrared photography and drying paper, and (4) an improved lamp for various studio and stage applications. Further, the practice of the present invention effectively utilizes the portions of the radiation spectrum unwanted for transmission by reflecting the unwanted portion back toward the filament so as to raise the operating temperature of the filament and improve the efficacy of the lamp.

What we claim as new and desire to secure by Letters Patent of the United States is:

1. A lamp for transmitting a desired portion of the radiation specturm for impinging onto a selected medium and inhibiting transmission of an unwanted portion of the radiation spectrum, said lamp comprising:

a single radiation transmissive envelope containing a filling of inert gas and a relatively small quantity of a halogen gas;

a tungsten filament for emitting radiation wavelengths in both the visible and infrared portions of the radiation spectrum, said filament being housing within and in close proximity to the walls of said envelope;

a reflective film on the outer surface of said envelope and effective to withstand an operating temperature of about 950° C., and to filter the radiation to be transmitted through said envelope;

said film comprising a plurality of stacks of layers of high and low indices refractory material and effective to establish a pass-band characteristic, and a stop-band characteristic both for the portion of radiation to be transmitted through said envelope, said pass-band and said stop-band characteristics being predeterminedly selected for said medium desired to be impinged by the radiation to be transmitted; through said envelope; and each of said stacks of layers consisting of a first, a second and then a third stack, said first, second and third stacks each consisting of layers of high index refractory material of predetermined thicknesses within ranges in nanometers of 83 to 137, 265 to 372, and 207 to 366 respectively and said stacks further having layers of low index refractory material of predetermined thicknesses within the ranges in nanometers of 142 to 207, 142 to 219, and 190 to 245, respectively.

2. A lamp according to claim 1 wherein:

said single radiation transmissive envelope comprises an elongated tubular envelope of vitreous material having inleads extending into and sealed at each end thereof;

said tungsten filament comprises a coil of tungsten wire extending axially within said envelope and fastened to said inleads at opposite ends thereof, said filament being proportioned to operated at a temperature in the range of approximately 1500° K. to 3400° K;

said envelope having supports spaced along the length of said filament and bearing against the envelope walls to maintain the filament centered, said filament being under tension sufficient to avoid excessive sagging between supports when heated to its operating temperature; and said envelope having said reflective film on its outer surface, said relective film having a pass-band and stop-band characteristic such that a major portion of the visible portion of the radiation spectrum emitted by said tungsten filament is reflected by the reflective film back toward said filament, and, a major portion of the infrared portion of the radiation spectrum emitted by said filament is transmitted through said envelope.

3. A lamp according to claim 2 wherein said coiled filament is comprised of multiple helically coiled tungsten wire axially extending through said elongated tubular envelope.

4. A lamp according to claim 1 for transmitting a desired portion of the radiation spectrum for impinging onto a selected medium which comprise a group of one or more persons and said reflective film comprises;

alternating layers of tantalum pentoxide $Ta_2O_5$ and silicon dioxide $SiO_2$ materials respectively having high and low indices of refraction, said alternating layers having a sequential stacked arrangement consisting of said first, said second and then said third stack of layers which sequence being repeated nine (9) times for a total of twenty-seven (27) stacked layers, said sequential stacked layers having (1) its first stack with a tantalum pentoxide ($Ta_2O_5$) layers of a thickness of 83 nanometers and a silicon dioxide ($SiO_2$) layer of a thickness of 155 nanometers, (2) its second stack with a tantalum pentoxide ($Ta_2O_5$) layer of a thickness of 371 nanometers and a silicon dioxide ($SiO_2$) layer of a thickness of 142 nanometers, and (3) its third stack with a tantalum pentoxide ($Ta_2O_5$) layer of a thickness of 366 nanometers and a silicon dioxide ($SiO_2$) of a thickness of 245 nanometers;

said reflective film having a pass-band characteristic in the range of about 1.2 to about 1.7 microns and a stop-band characteristic ranges of about 0.35 to about 1.2 microns and about 1.7 to about 2.6 microns.

5. A lamp according to claim 1 for transmitting a desired portion of the radiation spectrum for impinging onto a selected medium which comprises paper and said reflective film comprises;

alternating layers of tantalum pentoxide $Ta_2O_5$ and silicon dioxide $SiO_2$ materials respectively having high and low indices of refraction;

said alternating layers having a sequential stacked arrangement consisting of said first, said second, and then said third stack of layers which sequence being repeated nine (9) times for a total of twenty-seven (27) stacked layers, said sequential stacked layers having (1) its first stack with a tantalum pentoxide ($Ta_2O_5$) layer of a thickness of 107 nanometers and a silicon dioxide ($SiO_2$) layer of a thickness of 188 nanometers, (2) its second stack with a tantalum pentoxide ($Ta_2O_5$) layer of a thickness of 265 nanometers and a silicon dioxide ($SiO_2$) layer of a thickness of 170 nanometers, and (3) its third stack with a tantalum pentoxide ($Ta_2O_5$) layer of a thickness of 207 nanometers and a silicon dioxide ($SiO_2$) layer of a thickness of 155 nanometers;

said reflective film having a pass-band characteristic in the range of about 1.86 to about 2.0 microns and a stop-band characteristic in the range of about 0.4 to about 1.8 microns.

6. A lamp according to claim 1 for transmitting a desired portion of the radiation spectrum for impinging onto a selected medium which comprises cellulose acetate and said reflective film comprises;

alternating layers of tantalum pentoxide $Ta_2O_5$ and silicon dioxide $SiO_2$ materials respectively having high and low indices of refraction;

said alternating layers having a sequential stacked arrangement consisting of said first, said second, and then said third stack of layers which sequence being repeated nine (9) times for a total of twenty-seven (27) stacked layers, said sequential stacked layers having (1) its first stack with a tantalum pentoxide ($Ta_2O_5$) layer of a thickness of 137 nanometers and a silicon dioxide ($SiO_2$) layer of a thickness of 207 nanometers (2) its second stack with a tantalum pentoxide ($Ta_2O_5$) layer of a thickness of 299 nanometers and a silicon dioxide ($SiO_2$) layer of a thickness of 219 nanometers, (3) its third stack with a tantalum pentoxide ($Ta_2O_5$) layer of a thickness of 242 nanometers and a silicon dioxide ($SiO_2$) layer of a thickness of 190 nanometers;

said reflective film having a pass-band characteristic in the range of about 2.2 to about 3.0 microns and a stop-band characteristic in the range of about 0.4 to about 2.15 microns.

7. A lamp according to claim 1 wherein said reflective film has characteristics so that lamp output light has an apparent color temperature of approximately 5500° Kelvin.

* * * * *